US012747822B2

(12) United States Patent
Fan et al.

(10) Patent No.: US 12,747,822 B2
(45) Date of Patent: Sep. 29, 2026

(54) ROTATABLE HINGES

(71) Applicant: Hewlett-Packard Development Company, L.P., Spring, TX (US)

(72) Inventors: Yao-Wen Fan, Taipei City (TW); Chih Chien Chen, Taipei City (TW); Kuo Chih Huang, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 135 days.

(21) Appl. No.: 18/875,524

(22) PCT Filed: Jun. 17, 2022

(86) PCT No.: PCT/US2022/033932
§ 371 (c)(1),
(2) Date: Dec. 16, 2024

(87) PCT Pub. No.: WO2023/244241
PCT Pub. Date: Dec. 21, 2023

(65) Prior Publication Data

US 2026/0022733 A1 Jan. 22, 2026

(51) Int. Cl.
*F16M 11/10* (2006.01)
*F16M 11/06* (2006.01)
*F16M 11/08* (2006.01)

(52) U.S. Cl.
CPC .................................... *F16M 11/08* (2013.01)

(58) Field of Classification Search
CPC ........ F16M 11/06; F16M 11/08; F16M 11/10; F16M 11/105; F16M 2200/021; F16M 2200/024
USPC ...... 248/149, 221.11, 222.13, 919, 917, 922, 248/923
See application file for complete search history.

(56) References Cited

U.S. PATENT DOCUMENTS 7,725,988 B2 * 6/2010 Kim ...................... G06F 1/1681 16/361
7,789,363 B2 * 9/2010 Duan ..................... F16M 11/10 361/679.01
7,984,533 B2 * 7/2011 Wei ......................... G06F 1/162 16/337
8,016,252 B2 * 9/2011 Su .......................... F16M 11/10 248/188.5

(Continued)

FOREIGN PATENT DOCUMENTS

EP 2549169 A2 1/2013

*Primary Examiner* — Terrell L Mckinnon
*Assistant Examiner* — Asa Franklin Solomon
(74) *Attorney, Agent, or Firm* — Quarles & Brady LLP

(57) ABSTRACT

In some examples, a rotatable hinge can include a center shaft, a top bracket including a central aperture and an offset aperture, a bottom bracket including a central aperture, a collar including a central aperture, a notch, and a channel, and a latching member interfaced with the offset aperture, the latching member including an extension member having a first flange and a column having a second flange, where when the latching member is in a first position, the second flange of the latching member is located in the notch of the collar and when the latching member is in a second position, the second flange of the latching member is located in the channel of the collar such that the top bracket and the latching member are rotatable about the center shaft.

15 Claims, 8 Drawing Sheets

(56) References Cited

U.S. PATENT DOCUMENTS 8,020,254 B2 * 9/2011 Lin .................... E05D 11/087 16/334
8,084,689 B2 * 12/2011 Li .................... G06F 1/1616 16/277
8,096,019 B2 * 1/2012 Lin .................... E05D 11/087 16/335
8,199,473 B2 * 6/2012 Zhou .................... F16M 11/2021 361/679.21
8,348,206 B2 * 1/2013 Wang .................... F16M 11/10 248/176.1
9,342,101 B2 * 5/2016 Hsu .................... G06F 1/1679
9,785,198 B2 * 10/2017 Grinstead .................... G06F 1/1632
9,824,547 B2 11/2017 Baitz et al.
10,638,620 B2 * 4/2020 Huang .................... F16M 11/08
10,852,775 B1 * 12/2020 Kim .................... G06F 1/203
11,162,527 B2 * 11/2021 Grziwok .................... F16M 11/14
11,766,122 B1 * 9/2023 Fan .................... F16B 2/12 248/231.71
11,815,932 B2 * 11/2023 Kim .................... G06F 1/1652
11,840,842 B2 * 12/2023 Kaplan .................... E04F 11/1817
11,868,186 B2 * 1/2024 Kato .................... G06F 1/1618
11,905,770 B2 * 2/2024 Keast .................... E21B 19/161
11,906,103 B1 * 2/2024 Xie .................... F16M 11/04
11,927,994 B2 * 3/2024 Lee .................... E05D 3/02
11,934,223 B2 * 3/2024 Sun .................... G06F 1/1681
12,326,567 B2 * 6/2025 Skye .................... G02B 27/0176
12,498,767 B2 * 12/2025 Kim .................... G06F 1/1616
12,558,276 B2 * 2/2026 Schmidt .................... A61G 5/0833
12,612,939 B2 * 4/2026 Yee .................... E05D 3/14
2001/0055197 A1 * 12/2001 Agata .................... G06F 1/1616 361/679.05
2004/0118984 A1 * 6/2004 Kim .................... F16C 11/0619 248/917
2005/0039301 A1 * 2/2005 Lu .................... G06F 1/1681 16/321
2007/0186380 A1 * 8/2007 Kim .................... G06F 1/1616 16/239
2009/0095857 A1 * 4/2009 Su .................... F16M 11/10 248/188.5
2010/0139043 A1 * 6/2010 Lin .................... E05D 11/087 16/319
2011/0016668 A1 * 1/2011 Lin .................... E05D 11/087 16/342
2012/0105741 A1 * 5/2012 Takao .................... H04N 5/64 348/836
2012/0293938 A1 * 11/2012 Dai .................... G06F 1/1622 361/679.44
2012/0324675 A1 * 12/2012 Huang .................... G06F 1/1681 16/319
2013/0021723 A1 1/2013 Harper et al.
2014/0360296 A1 * 12/2014 Hsu .................... G06F 1/1679 74/98
2016/0234950 A1 * 8/2016 Yeh .................... F16M 11/10
2017/0257962 A1 * 9/2017 Huang .................... F16M 11/041
2021/0088177 A1 * 3/2021 Massey .................... F16M 11/24
2021/0363819 A1 * 11/2021 Shopp .................... E06B 9/42
2021/0405685 A1 * 12/2021 Hobbs .................... G06F 1/18
2023/0026251 A1 * 1/2023 Tracy .................... F16M 11/105
2023/0077871 A1 * 3/2023 Matlin .................... F16M 11/125 248/176.1
2023/0181004 A1 * 6/2023 Ubbesen .................... A61B 1/00048 600/109
2023/0319173 A1 * 10/2023 Huang .................... H04M 1/0268 455/566
2023/0333589 A1 * 10/2023 Lee .................... F16M 11/2021
2024/0003174 A1 * 1/2024 Salutzki .................... E05F 3/22
2024/0093830 A1 * 3/2024 Barros .................... F16M 11/041
2024/0181659 A1 * 6/2024 Lunde .................... B25J 18/00
2024/0209979 A1 * 6/2024 Newville .................... F16M 11/2014
2024/0365913 A1 * 11/2024 Teetzel .................... A42B 3/324
2025/0079809 A1 * 3/2025 Honsinger .................... G02B 6/4441
2025/0116368 A1 * 4/2025 Kolonia .................... F16M 11/046
2025/0130453 A1 * 4/2025 Dong .................... G02F 1/133308
2025/0240901 A1 * 7/2025 Yun .................... H04M 1/022
2025/0257602 A1 * 8/2025 Wolf .................... B60J 1/085
2026/0022733 A1 * 1/2026 Fan .................... F16M 11/08

* cited by examiner

ROTATABLE HINGES

BACKGROUND

Computing devices utilize display devices to display information to a user. Such information may be presented to a user for various purposes, such as for work, retail, education, gaming, multimedia, and/or other general purposes. The display devices may be viewed in different orientations based on a type of display device, a type of use, user preferences, etc.

DETAILED DESCRIPTION

Figure 1:
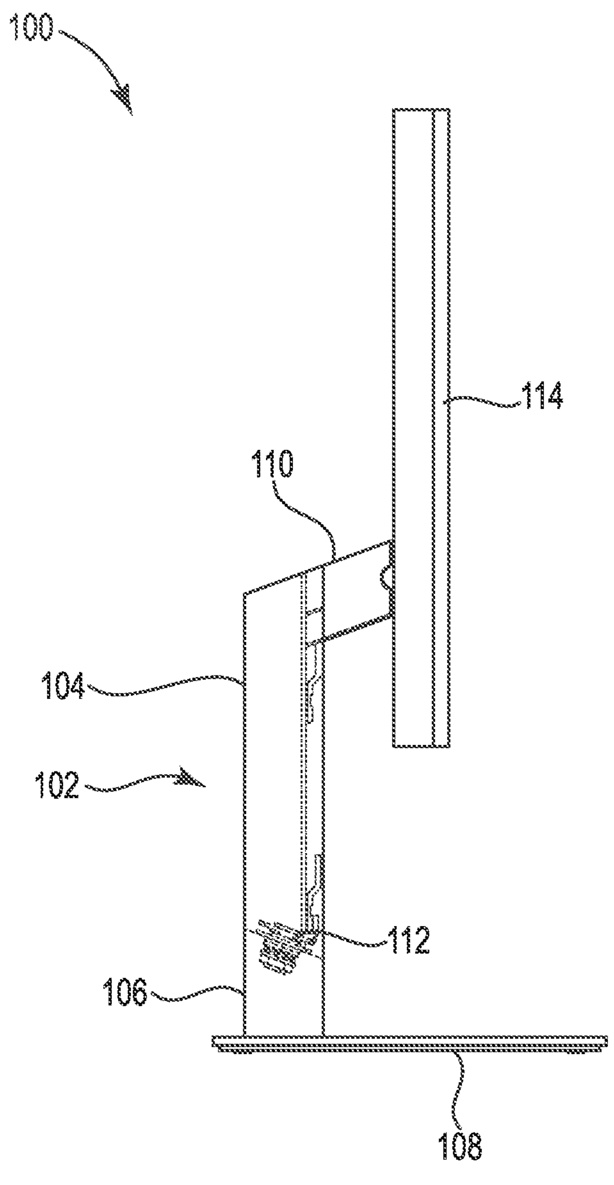
FIG. 1 is a side view of an example of a computing device, a stand including a rotatable hinge, and a display device in a standing orientation consistent with the disclosure.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer (e.g., a computing device in which computing hardware and a display device are included in a single housing), among other types of computing devices.

In some examples, the computing device includes a display device to display images generated by the computing device (or another computing device connected to the display device) and/or to allow the user to interact with the computing device. As used herein, the term "display device" refers to an output device that includes a display area that displays information provided by an electrical signal in a visual and/or tactile form. As used herein, the term "display area" refers to an area of a display device that displays information. For example, a computing device can include a display device having a display area that can display information such as text, videos, and/or images, as a result of an electrical signal provided to the display from the computing device. In some examples, the display device is utilized to display the user interface that allows the user to interact with the computing device and/or instruct the computing device to perform particular functions.

As mentioned above, users may utilize a display device for various purposes. For example, a user may utilize the display device for work, retail, education, gaming, multimedia, and/or other general purposes. In some instances, the display device may be more easily viewed and/or interacted with in particular orientations. For instance, for educational purposes the display device may be better viewed in standing orientation (e.g., an orientation in which the display device is oriented at a substantially perpendicular orientation relative to a base of the display device). However, in other examples, the display device may be better viewed in a recline orientation (e.g., an orientation in which the display device is oriented at an angle relative to a base of the display device), where a user may be looking "downwards" at the display device, such as in a retail environment, graphic design environment, computer-aided design (CAD) environment, in creative environments (e.g., digital art, etc.), among other such environments.

However, in previous approaches, in order to utilize a display device in a standing orientation or a recline orientation, a user had to purchase an additional stand for the display device. Additionally, the user would have to decouple the display device from the original stand and recouple the display device to the new stand and/or vice versa whenever the user wanted to switch display device orientations (e.g., standing orientation to recline orientation and/or vice versa). Such an approach causes the user to perform complex mechanical tasks on the display device, risking damage to the display device and/or stands.

Rotatable hinges according to the disclosure can allow for a single stand to be utilized to allow for a display device to be switched between different orientations. For example, a rotatable hinge can allow a display device to be moved between the standing and recline orientations without removing the display device from the stand. Such an approach can allow for easier transitions between display orientations, allowing for a better user experience as compared with previous approaches. Further, a single stand can be utilized, which can allow for easier manufacturing, lower part numbers, as well as reduced packing and/or shipping design, reducing costs as compared with previous approaches.

FIG. 1 is a side view of an example of a computing device 100, a stand 102 including a rotatable hinge 112, and a display device 114 in a standing orientation consistent with the disclosure. As illustrated in FIG. 1, the stand 102 includes a top portion 104, a bottom portion 106, and a base 108.

As illustrated in FIG. 1, the display device 114 can be in a standing orientation. For example, a user utilizing the display device 114 may be sitting to a "right side" of the display device 114 (e.g., as oriented in FIG. 1) such that the display device 114 is oriented at a substantially perpendicular orientation relative to the base 108 of the stand 102. As used herein, the term "substantially" intends that the characteristic does not have to be absolute but is close enough so as to achieve the characteristic. For example, "substantially perpendicular" is not limited to absolute perpendicular. For instance, the display device 114 can be within 0.5°, 1°, 2°, 5°, etc. of absolutely perpendicular relative to the base 108. Such variation may occur due to the display device 114 being rotated relative to the lift module 110 in order for a user to achieve different viewing angles of the display device 114.

While the display device 114 is illustrated in FIG. 1 as being in the standing orientation, rotatable hinges according to the disclosure can allow for the stand 102 to be utilized to switch the display device orientation from the standing orientation to a recline orientation, as is further described in connection with FIG. 7. Such a recline orientation can allow a more "downward" view of the display device 114 with respect to a user, which may be beneficial in certain environments.

The stand 102 can include a top portion 104, a bottom portion 106, and a base 108. The top portion 104 and the bottom portion 106 can comprise a column. As used herein, the term "column" refers to a support structure. For example, the top portion 104 and the bottom portion 106 can function as an upright support structure for the display device 114. Additionally, the stand 102 can include the base 108. As used herein, the term "base" refers to a bottom support. For example, the base 108 can function as a bottom support structure for the display device 114, enabling the computing device 100 to be placed on/rested on a surface (e.g., a desk, a table, etc.).

The computing device 100 can further include a lift module 110. As used herein, the term "lift module" refers to a mechanism allowing for movement of another object. For example, the lift module 110 can be connected to the display device 114 and can allow for vertical translation of the display device 114 when the display device 114 is in the standing orientation. The lift module 110 can, accordingly, be axially (e.g., vertically) translatable relative to the top portion 104 of the stand 102 when the display device 114 is in the standing orientation. Additionally, although not illustrated in FIG. 1, the lift module includes a push pin. The push pin can be located within the top portion 104 and can engage with the rotatable hinge 112, as is further described in connection with FIGS. 5A, 5B, and 6.

In order for the display device 114 to be moved between orientations, the rotatable hinge 112 may be utilized. As used herein, the term "rotatable hinge" refers to a mechanical device allowing for rotation of an object relative to another object. The rotatable hinge 112 can connect the top portion 104 of the stand 102 to the bottom portion 106 of the stand 102. As such, the rotatable hinge 112 can allow for the top portion 104 of the stand 102 (e.g., and accordingly, the lift module 110 and the display device 114) to rotate relative to the bottom portion 106 and the base 108. Such rotation can allow the display device 114 to be moved from the standing orientation (e.g., as illustrated in FIG. 1) to a recline orientation (e.g., as illustrated in FIG. 7) and vice-versa, as is further described herein.

Figure 2:
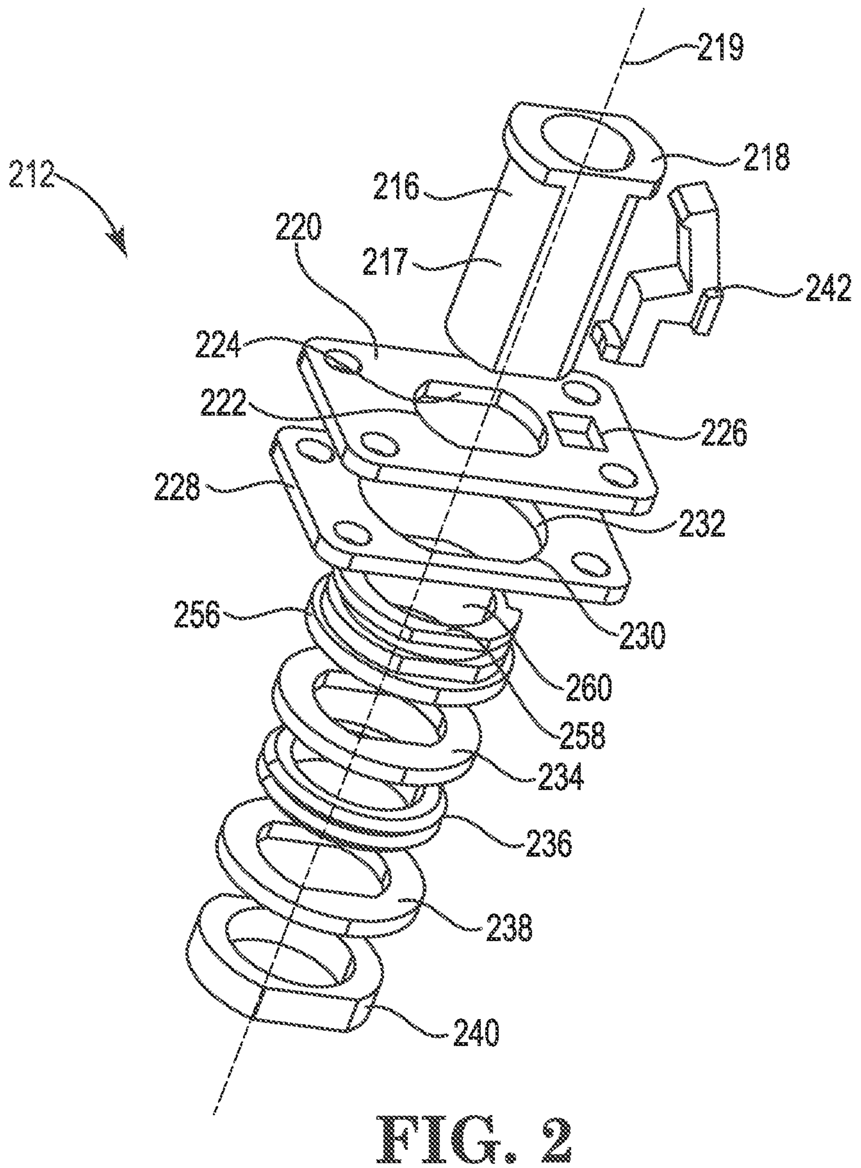
FIG. 2 is an exploded perspective view of an example of a rotatable hinge consistent with the disclosure.

FIG. 2 is an exploded perspective view of an example of a rotatable hinge 212 consistent with the disclosure. As illustrated in FIG. 2, the rotatable hinge 212 can include a center shaft 216, a top bracket 220, a bottom bracket 228, a latching member 242, and a collar 256.

As previously mentioned in FIG. 1, the rotatable hinge 212 can be utilized to allow rotation of a display device between different orientations. To facilitate such functionality, the rotatable hinge 212 can include a center shaft 216, a top bracket 220, a bottom bracket 228, a latching member 242, and a collar 256, as are further described herein.

The rotatable hinge 212 can include a center shaft 216. As used herein, the term "center shaft" refers to a slender pole to orient other objects about a common axis. The center shaft 216 can include an outer surface 217 and a top flange 218. As used herein, the term "flange" refers to an external ridge or rim of material to provide a location for placement of another object. The center shaft 216 can further include a central axis 219. The center shaft 216 can orient other portions of the rotatable hinge 212 about the central axis 219.

As illustrated in FIG. 1, the center shaft 216 can include an outer perimeter in the shape of a truncated circle. For example, a cross-section of the center shaft 216 (e.g., taken along a cut-line perpendicular to the central axis 219) yields a truncated circle shape in which the circle is bisected on opposite sides by parallel lines, resulting in two flat parallel surfaces connected by two curved surfaces that define the outer surface 217.

The rotatable hinge 212 can further include a top bracket 220. As used herein, the term "bracket" refers to a mechanical component to orient one object relative to another object. The top bracket 220 includes a central aperture 222. As used herein, the term "aperture" refers to an opening through an object. For example, the central aperture 222 can be an opening through the top bracket 220 located substantially in the center of the top bracket 220. The central aperture 222 can be in the shape of a truncated circle complimentary to the truncated circular shape of the center shaft 216. The central aperture 222 can include an inner surface 224 such that when the top bracket 220 is interfaced with the center shaft 216, the inner surface 224 is adjacent to the outer surface 217 of the center shaft 216.

The top bracket 220 can further include an offset aperture 226. The offset aperture 226 is offset a distance from the central axis 219 of the center shaft 216. Further, the latching member 242 is offset a distance from the central axis 219 of the center shaft 216. The offset aperture 226 can interface with a column of the latching member 242, as is further described in connection with FIG. 3. The latching member 242 can vertically translate relative to the top bracket 220 within the offset aperture 226 when interacted with by a push pin, as is further described in connection with FIGS. 5A, 5B, and 6.

As illustrated in FIG. 2, the rotatable hinge 212 further includes a bottom bracket 228. The bottom bracket 228 includes a central aperture 230. The central aperture 230 can be an opening through the bottom bracket 228 located substantially in the center of the bottom bracket 228. The central aperture 230 can include an inner surface 232 such that when the bottom bracket 228 is interfaced with the collar 256, the inner surface 232 is adjacent to a portion of the collar 256. The central aperture 230 of the bottom bracket 228 can be larger than the central aperture 222 of the top bracket 220 so that the bottom bracket 228 can be oriented adjacent to a portion (e.g., a lower outer surface) of the collar 256 when interfaced with the collar 256.

The rotatable hinge 212 further includes a latching member 242. The latching member 242 is further described in connection with FIG. 3.

The rotatable hinge 212 further includes a collar 256. The collar 256 can include a central aperture 258 having an inner surface 260 such that when the collar 256 is interfaced with the center shaft 216, the inner surface 260 is adjacent to the outer surface 217 of the center shaft 216. The collar 256 is further described in connection with FIG. 4.

As illustrated in FIG. 2, the top bracket 220, the bottom bracket 228, and the collar 256 can be interfaced with the center shaft 216. When the top bracket 220, the bottom bracket 228, and the collar 256 are interfaced with the center shaft 216, the central aperture 222 of the top bracket 220, the central aperture 230 of the bottom bracket 228, and the central aperture 258 of the collar 256 are coaxial with the central axis 219 of the center shaft 216.

As illustrated in FIG. 2, the rotatable hinge 212 can further include a friction plate 234, a spring washer 236, a friction plate 238, and a fastener 240. As used herein, the term "friction plate" refers to a sheet of material to resist motion. As used herein, the term "spring washer" refers to a metal disk formed in an irregular shape so that when the metal disk is loaded by two objects, it deflects and acts like a spring and provides a pre-load between the two objects. As used herein, the term "fastener" refers to a hardware device that mechanically joins two or more objects together. The friction plate 234, spring washer 236, friction plate 238, and fastener 240 can be coaxially interfaced with the center shaft 216. For example, when interfaced together, the spring washer 236 can provide a pre-load between the friction plate 234 and the friction plate 238 to resist motion by the collar 256 and bottom bracket 228.

When interfaced together, the fastener 240 can prevent vertical motion of the top bracket 220, the bottom bracket 228, the collar 256, the friction plate 234, spring washer 236, and friction plate 238. The fastener 240 can be, for example, a nut that can be threaded onto corresponding threads (e.g., located on the lower portion of the center shaft 216, not illustrated in FIG. 1). The top flange 218 of the center shaft 216 and the fastener 240 can hold the top bracket 220, the bottom bracket 228, the collar 256, the friction plate 234, spring washer 236, and friction plate 238 to keep the portions of the rotatable hinge 212 interfaced together.

Figure 3:
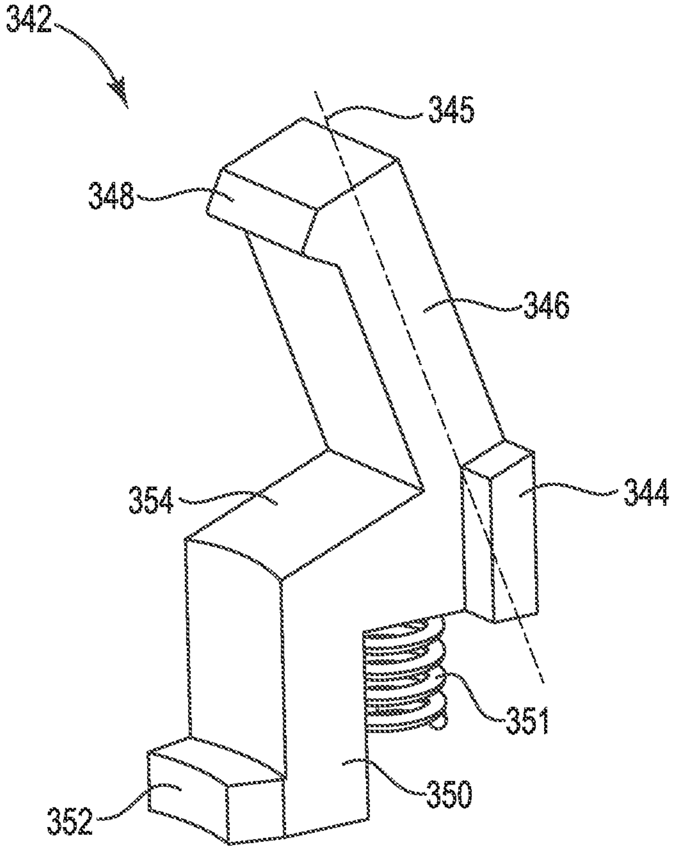
FIG. 3 is a perspective view of an example of a latching member for a rotatable hinge consistent with the disclosure.

FIG. 3 is a perspective view of an example of a latching member 342 for a rotatable hinge consistent with the disclosure. As illustrated in FIG. 3, the latching member 342 includes a body 344, an extension member 346, and a column 350.

As illustrated in FIG. 3, the latching member 342 can include the body 344. As used herein, the term "member" refers to a constituent part of a structural whole. For example, the latching member 342 can be comprised of a unitary body having different portions that make up the structural whole of the latching member 342. The body 344 can be a central section of the latching member 342. The body 344 can include an engagement surface 354. As used herein, the term "engagement surface" refers to an outer portion of an object at which another object interfaces with the object. For example, the engagement surface 354 can be a surface of the latching member 342 at which a push pin interfaces with the latching member 342, as is further described in connection with FIGS. 5A, 5B, and 6.

Located partially within the body 344 of the latching member 342 is a biasing element 351. As used herein, the term "biasing element" refers to an elastic device that stores mechanical energy. For example, the biasing element can be a spring, such as a helical coil spring. The biasing element can bias the latching member 342 into a first position, as is further described in connection with FIG. 5A.

The latching member 342 can additionally include an extension member 346. The extension member 346 can be a member extending from the body 344 of the latching member 342. As illustrated in FIG. 3, the extension member 346 includes a vertical axis 345. The vertical axis 345 is an axis which coincides with a vertical axis of the top portion of the stand (e.g., stand 102, previously described in connection with FIG. 1). In other words, the vertical axis 345 aligns the latching member 342 vertically with the top and bottom portions of the stand. As illustrated in FIG. 3, the body 344 of the latching member 342 extends from the extension member 346 at an angle relative to the vertical axis 345 of the extension member 346.

The extension member 346 includes a first flange 348. The first flange 348 can extend from the extension member 346 in a direction substantially perpendicular to the axis 345. The first flange 348 can be shaped, in some examples, as a triangular flange. The first flange 348 can engage with an engagement flange of a push pin, as is further described in connection with FIG. 5B.

The latching member 342 further includes a column 350. The column 350 can extend from the body 344. The column 350 can include a second flange 352. The second flange 352 can extend from the column 350 in a direction substantially perpendicular to the column 350. The second flange 352 can be shaped, in some examples, as a rectangular flange. The second flange 352 can be located within a notch of the collar or within a channel of the collar, as is further described in connection with FIGS. 5A, 5B, and 6.

Figure 4:
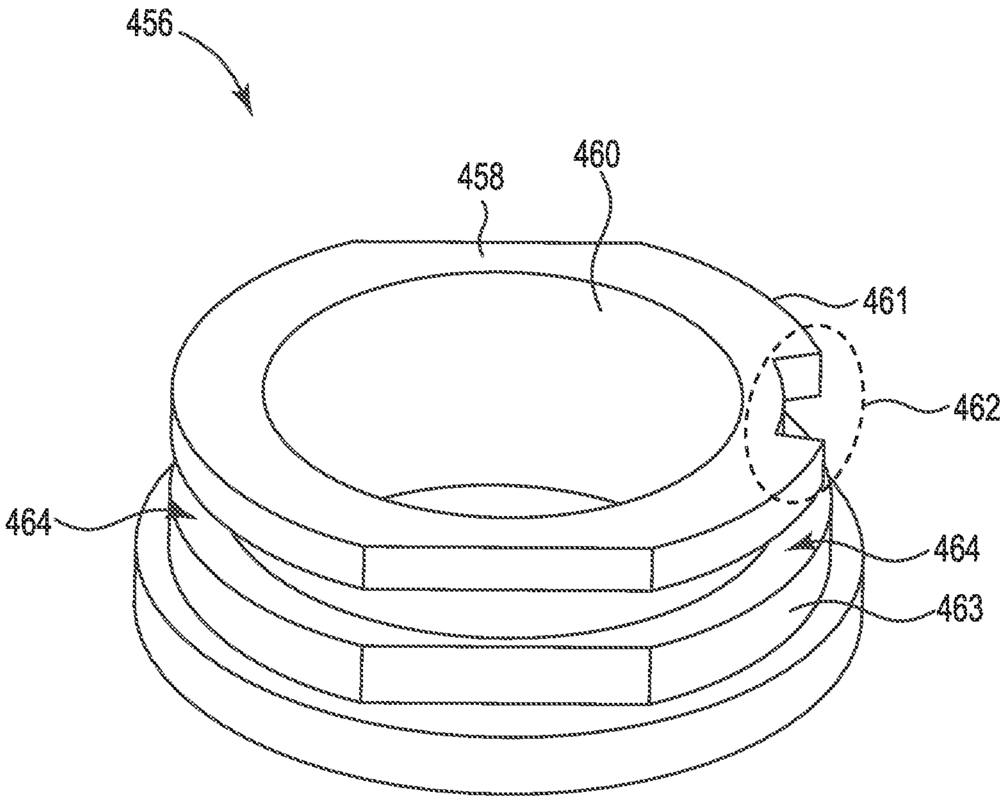
FIG. 4 is a perspective view of an example of a collar for a rotatable hinge consistent with the disclosure.

FIG. 4 is a perspective view of an example of a collar 456 for a rotatable hinge consistent with the disclosure. The collar 456 can include a central aperture 458, a notch 462, and a channel 464.

As illustrated in FIG. 4, the collar 456 includes the central aperture 458. The central aperture 458 can be an opening through the collar 456 and located substantially in the center of the collar 456. The central aperture 458 can include an inner surface 460 such that when the collar 456 is interfaced with the center shaft, the inner surface 460 is adjacent to the outer surface of the center shaft. The collar 456 can include a top flange 461 and a bottom flange 463.

The collar 456 additionally includes a notch 462. As used herein, the term "notch" refers to a recess of material. For example, the notch 462 can be a recess in the top flange 461. The notch 462 can be of a rectangular shape complimentary to the shape of the second flange (e.g., second flange 352, previously described in connection with FIG. 3) such that the second flange can be located in the notch 462 when the latching member is in a first position, as is further described in connection with FIGS. 5A and 6.

The collar 456 can further include a channel 464. As used herein, the term "channel" refers to an opening through a portion of material. The channel 464 can be defined by a space located between the top flange 461 and the bottom flange 463. The dimensions of the channel 464 can be complimentary to that of the second flange such that the second flange can be located within the channel 464 when the latching member is in a second position, and such that the second flange can translate around the channel 464, as is further described in connection with FIGS. 5B and 6.

Figure 5A:
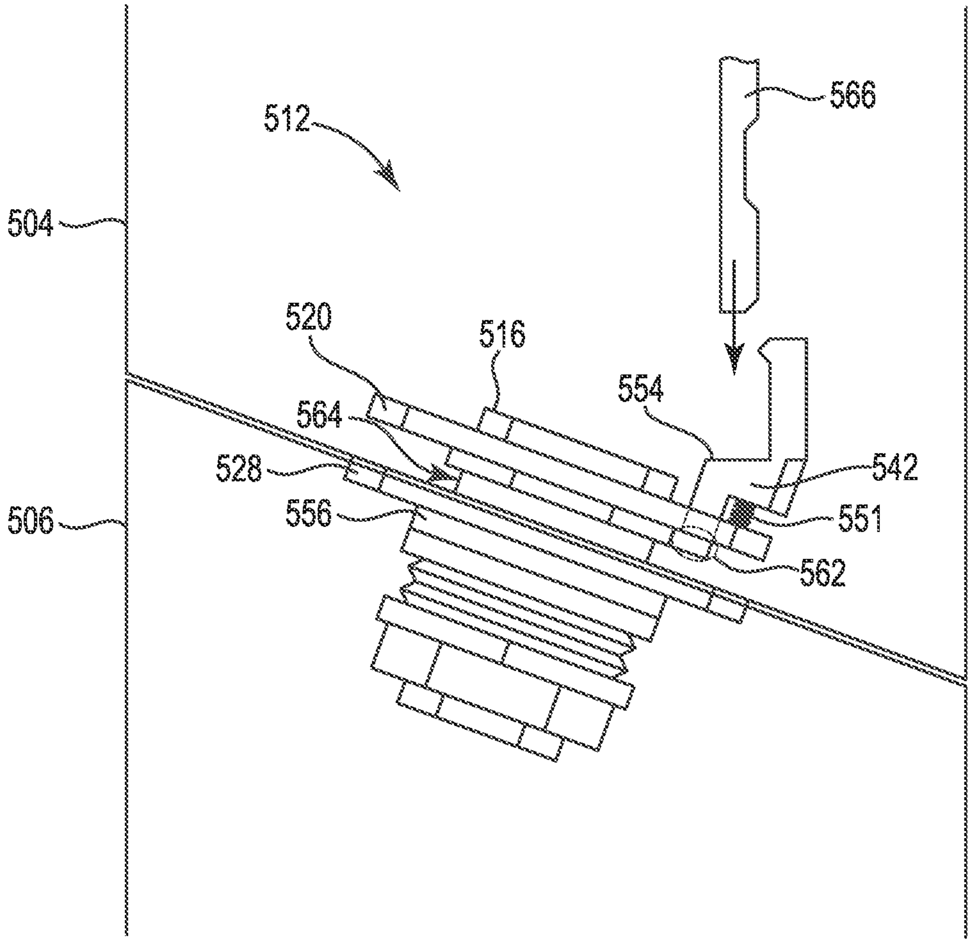
FIG. 5A is a side view of an example of a rotatable hinge including a latching member in a first position and a push pin consistent with the disclosure.

FIG. 5A is a side view of an example of a rotatable hinge 512 including a latching member 542 in a first position and a push pin 566 consistent with the disclosure. The rotatable hinge 512 can include the center shaft 516, the top bracket 520, the bottom bracket 528, the latching member 542, and the collar 556. The collar 556 can include the notch 562 and channel 564.

As illustrated in FIG. 5A, the rotatable hinge 512 is oriented at an angle relative to the top portion 504 and the bottom portion 506. The rotatable hinge 512 can connect the top portion 504 and the bottom portion 506. In an instance in which a user desires to rotate the display device from a standing orientation to a recline orientation, the user can rotate the top portion 504 relative to the bottom portion 506 utilizing the rotatable hinge 512, as is further described herein.

As illustrated in FIG. 5A, the latching member 542 is in a first position. In the first position, the second flange of the latching member 542 is located in the notch 562 of the collar 556. When the second flange of the latching member 542 is located in the notch 562, the display device can be in a standing orientation.

The biasing element 551 can bias the latching member 542 to the first position. For example, the biasing element 551 can be in a decompressed state, as illustrated in FIG. 5A. The biasing element 551 can be located partially within the body of the latching member 542 and be connected to the latching member 542 and to the top bracket 520.

A push pin 566 can be connected to the lift module (e.g., lift module 110, previously described in connection with FIG. 1). As used herein, the term "push pin" refers to a mechanical device that pushes another object when interacting with the another object. For example, the push pin 566 can push the latching member 542 when the push pin 566 interacts with the engagement surface 554, as is further described in connection with FIG. 5B.

The lift module is vertically translatable to provide different viewing heights for the display device for a user when the display device is in the standing orientation. When the lift module is vertically translated, the push pin 566 is correspondingly vertically translated when the display device is in the standing orientation. Accordingly, when the lift module is in a raised position, the second flange of the latching member 542 is located in the notch 562.

In order to begin the process of moving the display device from the standing orientation to a recline orientation, the lift module can be vertically translated downwards. When the lift module is vertically translated downwards, the push pin 566 engages with the engagement surface 554 of the latching member 542 and cause the latching member 542 to translate from the first position to the second position, as is further described in connection with FIG. 5B.

Figure 5B:
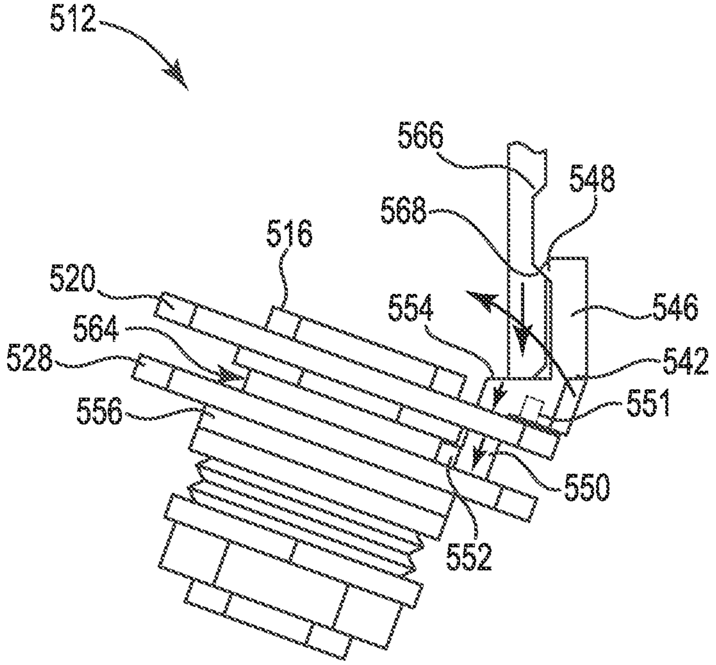
FIG. 5B is a side view of an example of a rotatable hinge including a latching member in a second position and a push pin consistent with the disclosure.

FIG. 5B is a side view of an example of a rotatable hinge 512 including a latching member 546 in a second position and a push pin 566 consistent with the disclosure. The rotatable hinge 512 can include the center shaft 516, the top bracket 520, the bottom bracket 528, the latching member 542, and the collar 556. The collar 556 can include the notch 562 and channel 564.

When the lift module is translated from a lifted position to a lowered position, the push pin 566 engages with the engagement surface 554 of the latching member 542 to cause the latching member 542 to translate from the first position (e.g., as previously illustrated in FIG. 5A) to the second position (e.g., as illustrated in FIG. 5B). For example, the push pin 566 can cause the latching member 546 to translate (e.g., partially vertically downwards and partially horizontally leftwards, as oriented in FIG. 5B) to the second position. The latching member 546 translating as described above can cause the biasing element 551 to compress to a compressed state.

As illustrated in FIG. 5B, the push pin 566 includes an engagement flange 568. The engagement flange 568 is to engage with the first flange 548. Such engagement can be a partial interference fit between the engagement flange 568 and the first flange 548. The engagement between the first flange 548 and the engagement flange 568 can work to resist vertical translation of the push pin 566 and the lift module when the lift module is in the lowered position. In such an orientation, the display device is unable to be translated relative to the top portion of the stand.

When the latching member 546 is in the second position, the second flange 552 extending from the column 550 is located in the channel 564 of the collar 556. In other words, as the latching member 546 translates from the first position to the second position, the second flange 552 translates from the notch of the collar 556 to the channel 564 of the collar 556.

When the second flange 552 is located in the channel 564 (e.g., when the latching member is in the second position), the top bracket 520, the latching member 546, and the push pin 566 (e.g., and the lift module, the top portion of the stand, and the display device) are rotatable about the center shaft 516 such that the display device is rotatable to a recline orientation (e.g., as is further described in connection with FIG. 7). That is, the top bracket 520 and the latching member 546 are rotatable about the center shaft 516 where the channel 564 guides the rotation of the latching member 546 (e.g., and the top bracket 520) via the second flange 552, allowing the top bracket 520, the latching member 546, the push pin 566, the lift module, the top portion of the stand, and the display device to be rotated about the center shaft 516.

Figure 6:
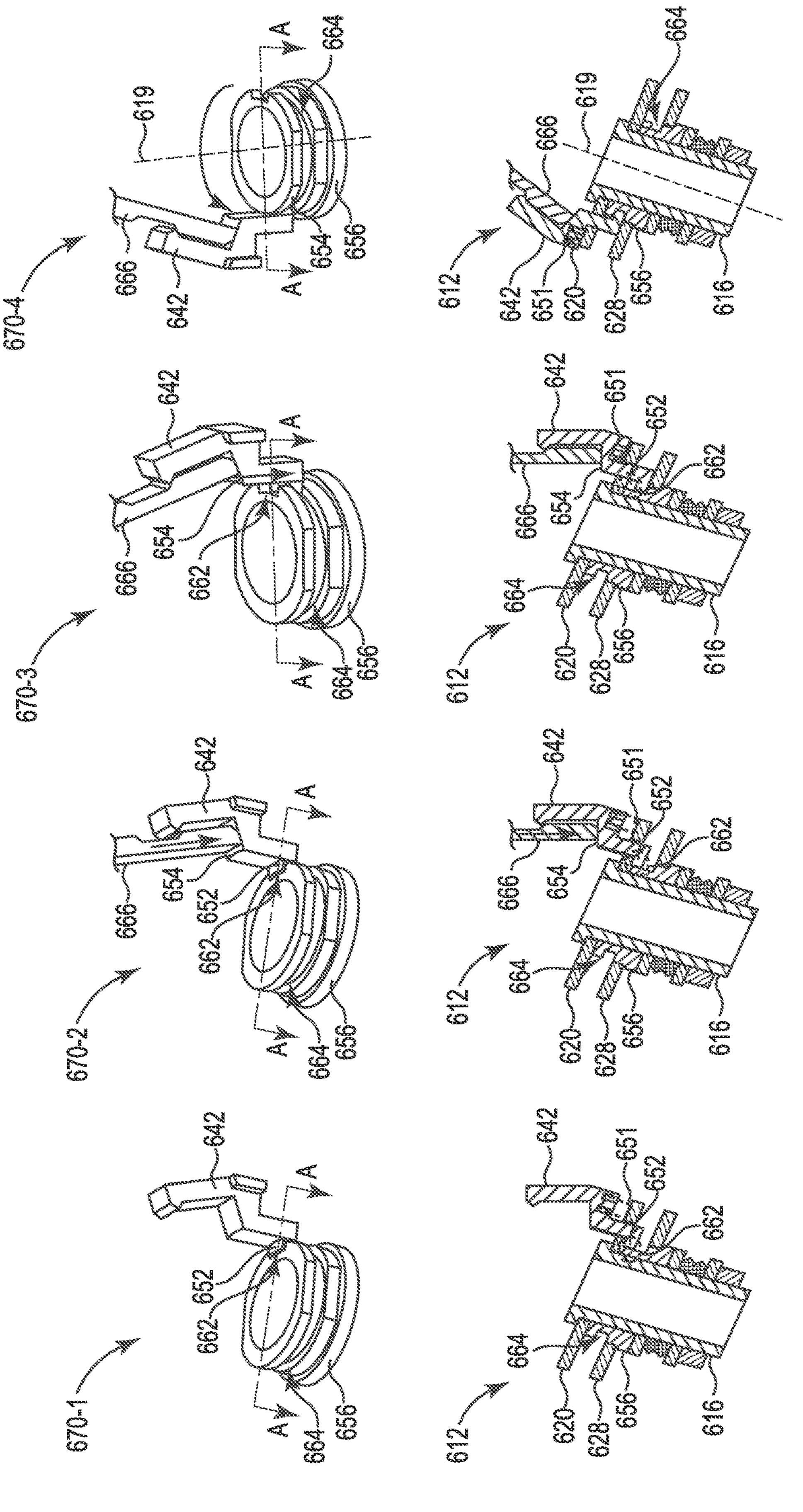
FIG. 6 illustrates perspective views and side-section views of an example rotatable hinge being rotated consistent with the disclosure.

FIG. 6 illustrates perspective views and side-section views of an example rotatable hinge 612 being rotated consistent with the disclosure. The rotatable hinge 612 can include the center shaft 616, the top bracket 620, the bottom bracket 628, the latching member 642, and the collar 656. The collar 656 can include the notch 662 and channel 664. The latching member 642 can include the second flange 652 and the biasing element 651. The rotatable hinge 612 is illustrated in FIG. 6 along four rotation steps 670-1, 670-2, 670-3, and 670-4.

At step 670-1, the latching member 642 is located in a first position. In the first position of the latching member 642, the biasing element 651 is in a decompressed state. When the latching member 642 is in the first position (e.g., and the lift module is in a raised position), the second flange 652 is located in the notch 662 of the collar 656 such that the display device is in a standing orientation. For example, as shown in the section view defined by cut-line "A-A", the second flange 652 can be located within the notch 662 such that the top bracket 620 and the latching member 642 are unable to rotate about the center shaft 616 (e.g., and the central axis 619). In such an orientation, the notch 662 prevents rotation of the latching member 642 and locks the display device in the standing orientation.

In order to move the display device from the standing orientation to the recline orientation, the lift module can be lowered from the raised position to the lowered position. As the lift module is lowered to the lowered position, the push pin 666 engages with the engagement surface 654 of the latching member 642 as illustrated at step 670-2. As the push pin 666 engages with the engagement surface 654, the push pin 666 causes the latching member 642 to begin to translate from the first position, compressing the biasing element 651.

At step 670-3, the latching member 642 is in the second position. For example, as the lift module continues to be lowered to the lowered position, the push pin 666 causes the latching member 642 to translate to the second position such that the second flange 652 vertically translates from the notch 662 to the channel 664 of the collar 656. As the latching member 642 translates to the second position, the biasing element 651 is compressed to a compressed state. In the second position, the second flange 652 is in the channel 664, and the top bracket 620, the latching member 646, and the push pin 666 are rotatable about the center shaft 616. The channel 664 guides the top bracket 620, the latching member 646, and the push pin 666 via the second flange 652.

In response to the second flange 652 being located in the channel 664, the latching member 642 and the top bracket 620 are rotatable about the center shaft 616 such that the latching member 642 is in a third position. For example, at step 670-4, the latching member 642, the top bracket 620, and the push pin 666 are rotated about the center shaft 616 (e.g., about the central axis 619). As a result of such rotation, the top portion of the stand, the lift module, and the display device are also rotated such that the display device is in the recline orientation.

Although the steps 670-1, 670-2, 670-3, and 670-4 illustrate the latching member 642 being moved from a first position, to a second position, and to a third position (e.g., allowing for a display device to be rotated from a standing orientation to a recline orientation), examples of the disclosure are not so limited. For example, when the display device is in the recline orientation and the latching member 642 is in the third position (e.g., at step 670-4), the top bracket 620 and the latching member 642 are rotatable about the center shaft 616 (e.g., the central axis 619) such that the latching member is in the second position (e.g., at step 670-3). When the latching member 642 is in the second position, the lift module can be raised from the lowered position to the raised position, causing the push pin 666 to disengage from the engagement surface 654. As the push pin 666 disengages from the engagement surface 654, the biasing element 651 can decompress from the compressed state to the decompressed state, causing the latching member 642 to move to the first position such that the second flange 652 vertically translates from the channel 664 of the collar 656 to the notch 662 of the collar 656.

Figure 7:
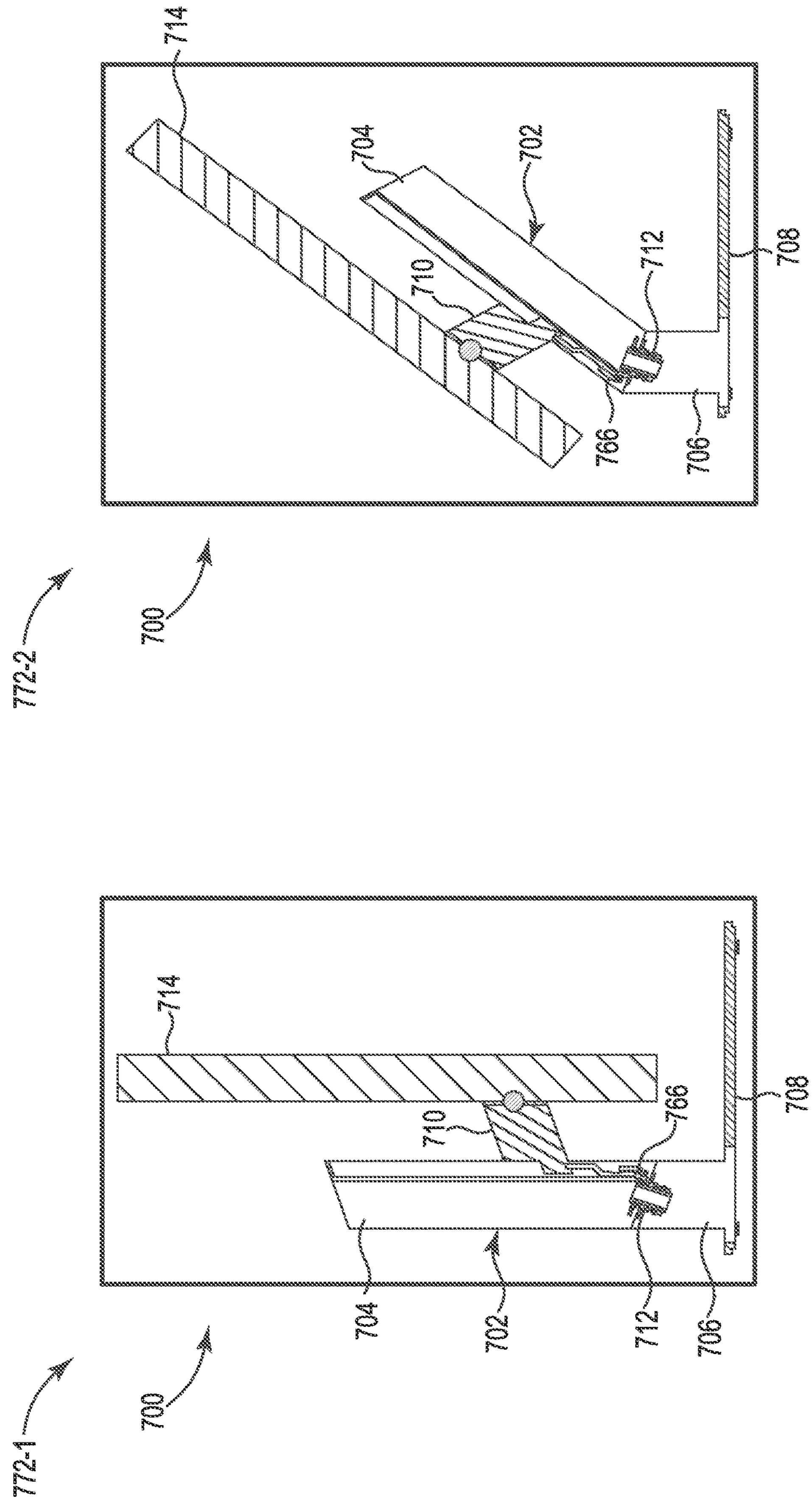
FIG. 7 is a side view of an example of a computing device, a stand including a rotatable hinge, and a display device being moved between a standing orientation and a recline orientation consistent with the disclosure.

FIG. 7 is a side view of an example of a computing device 700 including a stand 702 including a rotatable hinge 712, and a display device 714 being moved between a standing orientation 772-1 and a recline orientation 772-2 consistent with the disclosure. The display device 714 can be in the standing orientation 772-1 and the display device 714 can be in the recline orientation 772-2.

The computing device 700 can include the stand 702 including the top portion 704, the bottom portion 706, and the base 708. The top portion 704 can be connected to the bottom portion 706 via the rotatable hinge 712. Further, the display device 714 can be connected to the top portion 704 via the lift module 710. The lift module 710 can include the push pin 766.

As illustrated in FIG. 7, the display device 714 of the computing device 700 is in the standing orientation 772-1. In the standing orientation 772-1, the display device 714 can be in a substantially perpendicular orientation relative to the base 708. In some examples, a user may utilize the display device 714 of the computing device 700 in the standing orientation 772-1 for various purposes, such as work, retail, education, gaming, multimedia, and/or other general purposes. Some users may find the display device 714 to be more easily viewed and/or interacted with for such purposes in the standing orientation 772-1.

However, other users may find the display device 714 to be more easily viewed and/or interacted with in the recline orientation 772-2. In order to move the display device 714 to the recline orientation 772-2 from the standing orientation 772-1, the lift module 710 can be lowered to a lowered position so that the push pin 766 engages with the rotatable hinge 712 (e.g., an engagement surface of a latching member of the rotatable hinge 712, previously described in connection with FIGS. 2, 3, 5A, 5B, and 6). When the latching member of the rotatable hinge 712 is moved from a first position to a second position, the latching member (e.g., and the push pin 766, a top bracket, the top portion 704, the lift module 710, and the display device 714) are rotatable about a center shaft of the rotatable hinge 712 such that the display device 714 is in a recline orientation 772-2.

Rotatable hinges according to the disclosure can allow for a single stand to be utilized to allow for a display device to be switched between different orientations. For example, a rotatable hinge can allow a display device to be moved between the standing and recline orientations without removing the display device from the stand, allowing for the single stand to provide different display orientations, allowing for a better user experience as compared with previous approaches.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 112 in FIG. 1 and an analogous element may be identified by reference numeral 212 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on." "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A rotatable hinge, comprising:

a center shaft;

a top bracket including a central aperture and an offset aperture;

a bottom bracket including a central aperture;

a collar including a central aperture, a notch, and a channel; and a latching member interfaced with the offset aperture, the latching member including an extension member having a first flange and a column having a second flange;

wherein:

when the latching member is in a first position, the second flange of the latching member is located in the notch of the collar; and when the latching member is in a second position, the second flange of the latching member is located in the channel of the collar such that the top bracket and the latching member are rotatable about the center shaft.

2. The rotatable hinge of claim 1, wherein the latching member is translated from the first position to the second position in response to a push pin engaging an engagement surface of the latching member.

3. The rotatable hinge of claim 1, wherein:

the central aperture of the top bracket includes an inner surface that is adjacent to an outer surface of the center shaft;

the central aperture of the bottom bracket includes an inner surface that is adjacent to a lower outer surface of the collar; and the central aperture of the collar includes an inner surface that is adjacent to an outer surface of the center shaft.

4. The rotatable hinge of claim 1, wherein the top bracket, the bottom bracket, and the collar are interfaced with the center shaft such that the central aperture of the top bracket, the central aperture of the bottom bracket, and the central aperture of the collar are coaxial with a central axis of the center shaft.

5. The rotatable hinge of claim 4, wherein the offset aperture of the top bracket and the latching member are offset a distance from the central axis of the center shaft.

6. A computing device, comprising:

a stand including a top portion, a bottom portion, and a base;

a lift module included in the top portion of the stand, wherein the lift module includes a push pin;

a display device connected to the lift module; and a rotatable hinge connecting the top portion of the stand to the bottom portion of the stand, wherein the rotatable hinge includes:

a top bracket including an offset aperture;

a collar including a notch and a channel; and a latching member interfaced with the offset aperture, the latching member including an extension member having a first flange and a column having a second flange;

wherein:

when the latching member is in a first position, the second flange of the latching member is located in the notch of the collar such that the display device is in a standing orientation; and when the latching member is in a second position, the second flange of the latching member is located in the channel of the collar such that the top bracket and the latching member are rotatable about a center shaft such that the display device is rotatable to a recline orientation.

7. The computing device of claim 6, wherein when the lift module is translated from a lifted position to a lowered position, the push pin engages with an engagement surface of the latching member to cause the latching member to translate from the first position to the second position.

8. The computing device of claim 7, wherein the push pin includes an engagement flange such that when the lift module is in the lowered position, the engagement flange is to engage with the first flange of the extension member to resist vertical translation of the lift module.

9. The computing device of claim 7, wherein:

the latching member includes a biasing element to bias the latching member in the first position; and when the push pin engages with the engagement surface of the latching member to cause the latching member to translate from the first position to the second position, the push pin causes the biasing element to be compressed.

10. The computing device of claim 6, wherein in response to the second flange of the latching member being located in the channel:

the latching member and the top bracket are rotatable about the center shaft such that the latching member is in a third position; and the top portion of the stand, the lift module, and the display device are rotatable relative to the bottom portion and the base of the stand such that the display device is in the recline orientation.

11. A computing device, comprising:

a stand including a top portion, a bottom portion, and a base;

a lift module included in the top portion of the stand, wherein the lift module includes a push pin and is vertically translatable within the top portion of the stand;

a display device connected to the lift module; and a rotatable hinge connecting the top portion of the stand to the bottom portion of the stand, wherein the rotatable hinge includes:

a top bracket including a central aperture and an offset aperture;

a bottom bracket including a central aperture;

a collar including a central aperture, a notch and a channel, wherein the collar is partially located within the central aperture of the bottom bracket; and a latching member including an extension member having a first flange and a column having a second flange, wherein the column is interfaced with the offset aperture;

wherein:

when the latching member is in a first position, the second flange of the latching member is located in the notch of the collar such that the display device is in a standing orientation;

in response to the lift module vertically translating from a raised position to a lowered position, the push pin causes the latching member to translate from the first position to a second position such that the second flange vertically translates from the notch to the channel of the collar; and when the latching member is in the second position, the top bracket and the latching member are rotatable about a center shaft such that the display device is rotatable to a recline orientation.

12. The computing device of claim 11, wherein when the second flange is in the channel of the collar, the top portion of the stand, the lift module, and the display device are rotatable relative to the bottom portion and the base of the stand such that the display device is in the recline orientation.

13. The computing device of claim 11, wherein when display is in the recline orientation and the latching member is in a third position, the top bracket and the latching member are rotatable about the center shaft such that the latching member is in the second position.

14. The computing device of claim 13, wherein in response to the lift module vertically translating from the lowered position to the raised position when the latching member is in the second position:

the push pin disengages from an engagement surface of the latching member; and a biasing element causes the latching member to translate from the second position to the first position such that the second flange vertically translates from the channel of the collar to the notch.

15. The computing device of claim 11, wherein when the lift module is in the raised position, the second flange is located in the notch such that the notch prevents rotation of the latching member and locks the display in the standing orientation.

* * * * *